US012245011B2

(12) United States Patent
Zhao

(10) Patent No.: US 12,245,011 B2
(45) Date of Patent: Mar. 4, 2025

(54) ACTIVE NOISE REDUCTION ACOUSTIC UNIT AND SOUND-PRODUCING UNIT

(71) Applicant: Goertek Inc., Shandong (CN)

(72) Inventor: Shenggang Zhao, Welfang (CN)

(73) Assignee: Goertek Inc., Shandong (CN)

( * ) Notice: Subject to any disclaimer, the term of this patent is extended or adjusted under 35 U.S.C. 154(b) by 212 days.

(21) Appl. No.: 17/778,245

(22) PCT Filed: Dec. 28, 2019

(86) PCT No.: PCT/CN2019/129566
§ 371 (c)(1),
(2) Date: May 19, 2022

(87) PCT Pub. No.: WO2021/098014
PCT Pub. Date: May 27, 2021

(65) Prior Publication Data
US 2023/0020424 A1 Jan. 19, 2023

(30) Foreign Application Priority Data
Nov. 22, 2019 (CN) ......................... 201911159350.1

(51) Int. Cl.
*H04R 1/10* (2006.01)
*H04R 7/12* (2006.01)

(52) U.S. Cl.
CPC ............. *H04R 7/12* (2013.01); *H04R 1/1083* (2013.01); *H04R 2207/021* (2013.01)

(58) Field of Classification Search
CPC ................................ H04R 1/1083; H04R 1/02
USPC ......................................................... 381/351
See application file for complete search history.

(56) References Cited

U.S. PATENT DOCUMENTS

| | | | | |
|---|---|---|---|---|
| 10,694,297 B1 * | 6/2020 | Lee | B81B 7/0061 | |
| 2010/0127376 A1 * | 5/2010 | Karim | H04R 19/016 | 257/E23.18 |
| 2012/0003612 A1 * | 1/2012 | Gerber | F41G 3/2683 | 434/11 |
| 2013/0343564 A1 * | 12/2013 | Darlington | H04R 1/1083 | 381/74 |
| 2015/0010199 A1 * | 1/2015 | Kim | H04R 11/02 | 381/417 |

(Continued)

FOREIGN PATENT DOCUMENTS

| | | |
|---|---|---|
| CN | 204350255 U | 5/2015 |
| CN | 205039984 U | 2/2016 |

(Continued)

*Primary Examiner* — Katherine A Faley
(74) *Attorney, Agent, or Firm* — Baker Botts LLP

(57) ABSTRACT

Disclosed are an active noise reduction acoustic unit and a sound-producing unit, the active noise reduction acoustic unit includes a casing; a baseplate which is arranged in the casing and separates the casing into a first accommodating cavity and a second accommodating cavity; the first accommodating cavity and the second accommodating cavity are in communication with each other, the second accommodating cavity being provided therein with a feedback microphone, and the feedback microphone being configured to pick up noise signals; and the first accommodating cavity is provided therein with a moving iron speaker which can vibrate and produce sound according to the noise signals.

11 Claims, 2 Drawing Sheets

(56) References Cited

U.S. PATENT DOCUMENTS

| | | | | |
|---|---|---|---|---|
| 2015/0055810 | A1* | 2/2015 | Shin | H04R 1/1083<br>381/332 |
| 2016/0037263 | A1* | 2/2016 | Pal | H04R 19/04<br>381/113 |
| 2017/0223441 | A1* | 8/2017 | Rasmussen | H04R 1/086 |
| 2018/0091883 | A1 | 3/2018 | Howes et al. | |
| 2020/0322712 | A1* | 10/2020 | Williams | G10K 11/17875 |

FOREIGN PATENT DOCUMENTS

| | | | |
|---|---|---|---|
| CN | 206181318 | U | 5/2017 |
| CN | 110099323 | A | 8/2019 |

* cited by examiner

ACTIVE NOISE REDUCTION ACOUSTIC UNIT AND SOUND-PRODUCING UNIT

CROSS-REFERENCE TO RELATED APPLICATIONS

The application is a National Stage of International Application No PCT/CN2019/129566, which claims priority to Chinese Patent Application No. 201911159350.1 filed with the CNIPA on Nov. 22, 2019 and entitled 'active noise reduction acoustic unit and sound-producing unit', which are hereby incorporated by reference in their entireties.

TECHNICAL FIELD

The present disclosure relates to the technical field of electroacoustic conversion, more particularly to an active noise reduction acoustic unit and a sound-producing unit.

BACKGROUND

With progress of science and technology and increasing improvement of living standards, electronic products become increasingly popular, and consumer demands on the electronic products are increasingly high. At present, earphones are widely used in daily life and work. In addition to music and entertainment functions, earphones are further widely applied to noise isolation so as to guarantee a user a relatively quiet environment. However, regarding low frequency noises, there are limitations for earphones in noise isolating performance and capability. At present, there are noises everywhere in life. In order to help people enjoy music in a quiet environment without external noise interruptions, noise-reducing earphones are becoming increasingly popular. A noise-reducing earphone can not only reduce environmental noises to protect hearing of the user, but also enable the user to enjoy high quality music so as to improve music enjoying experience. Therefore, the noise-reducing earphone is increasingly preferred by massive consumers. Nowadays, more and more earphones are integrated with active noise reduction functions. The active noise reduction earphone can reduce influence of the environment noises in work, study and life, thereby improving living and working environments as well as living quality.

In recent years, two-way wireless earphones are developing rapidly and becoming more and more popular with increasingly comprehensive functions. A combination of two-way wireless function and active noise reduction has become a trend of industrial development. A two-way wireless earphone is convenient to wear and needs to be made small, however, this results in a quite limited internal space thereof, because apparatuses such as a battery, a PCB, an antenna and a sensor needs to be arranged in the earphone, and an additional feedback microphone is needed for active noise reduction, which microphone also occupies a relatively large space. What is more, the feedback microphone needs to occupy a space in the front cavity. This results in a large front cavity or a small sound outlet hole and influences the acoustic performance.

In view of this, it is necessary to provide a novel technical solution to solve the above technical problems.

SUMMARY

It is thereof an object of the present disclosure to provide a novel technical solution of an active noise reduction acoustic unit and a sound-producing unit.

According to a first aspect of the present disclosure, provided is an active noise reduction acoustic unit, wherein the active noise reduction acoustic unit includes:

A casing;

A baseplate which is arranged in the casing and separates the casing into a first accommodating cavity and a second accommodating cavity;

The first accommodating cavity and the second accommodating cavity are in communication with each other, the second accommodating cavity being provided therein with a feedback microphone, and the feedback microphone being configured to pick up noise signals; and The first accommodating cavity is provided therein with a moving iron speaker which can vibrate and produce sound according to the noise signals.

Optionally, the moving iron speaker comprises a voice coil, magnets, an iron sheet, a vibrating diaphragm and a connecting bar; there are two oppositely arranged magnets with a gap therebetween; the iron sheet penetrates through the voice coil and is inserted into the gap between the two magnets; and the connecting bar has one end thereof fixed to the iron sheet and the other end thereof fixed to the vibrating diaphragm.

Optionally, a side portion of the casing is provided with a sound outlet in a position close to the vibrating diaphragm.

Optionally, the feedback microphone includes a capacitance acoustoelectric conversion component and a signal processing component, wherein the capacitance acoustoelectric conversion component and the signal processing component are in electrical connection and both are arranged on the baseplate.

Optionally, the baseplate is provided with a sound hole in a position corresponding to the capacitance acoustoelectric conversion component, and the sound hole is in communication with the first accommodating cavity.

Optionally, the capacitance acoustoelectric conversion component is an MEMS and the signal processing component is an ASIC chip.

Optionally, the MEMS is formed with a vibrating diaphragm and a back electrode plate, and the sound hole is in communication with a back cavity in the MEMS.

Optionally, the baseplate is a PCB.

Optionally, the casing includes a first casing and a second casing, the first casing and the baseplate enclose the first accommodating cavity, and the second casing and the baseplate enclose the second accommodating cavity; and the baseplate and the first casing are integrally formed, and the baseplate and the second casing are welded or bonded together.

According to another aspect of the present invention, provided is a sound-producing unit, including an outer casing and the active noise reduction acoustic unit arranged in the outer casing, wherein the outer casing is provided therein with a sound cavity and a sound outlet tube in communication with each other, and an end of the sound outlet tube far away from the sound cavity is provided with a sound outlet opening; the active noise reduction acoustic unit is located in the sound outlet tube, and a sound outlet of the active noise reduction acoustic unit is provided facing the sound outlet opening; or the active noise reduction acoustic unit is located in the sound cavity, a sound outlet of the active noise reduction acoustic unit is provided facing the sound outlet opening, and a side surface of the active noise reduction acoustic unit provided with the sound outlet is located in a position where the sound cavity and the sound outlet tube meet.

According to the active noise reduction acoustic unit provided by the present invention, the baseplate thereof is a shared component which separates the casing into the first accommodating cavity and the second accommodating cavity, wherein the first accommodating cavity is used for carrying the moving iron speaker and the second accommodating cavity is used for carrying the feedback microphone. That is, the moving iron speaker and the feedback microphone are assembled and integrated into one acoustic unit, such that the dimension can be reduced effectively. Further, functions of the moving iron speaker and the feedback microphone can be tested uniformly when the unit is tested after the active noise reduction acoustic unit is assembled to the unit, thereby effectively saving the testing time and improving the testing consistence.

BRIEF DESCRIPTION OF THE DRAWINGS

In order to describe the embodiments of the application or the technical solutions in the prior art more clearly, brief introduction on drawings needed to be used in the description of embodiments and prior art will be made below. It is obvious that the drawings described below are a part of drawings of the application, and those skilled in the technical field further can obtain other drawings according to the drawings without creative efforts.

DETAILED DESCRIPTION

Description will be made on technical solutions in the embodiments of the application below in combination with drawings in the embodiments of the application. It is apparent that the described embodiments are merely a part rather than all of the embodiments of the application. All the other embodiments obtained based on any embodiment of the application by those skilled in the art without creative efforts shall fall into the scope of protection of the application.

Figure 1:
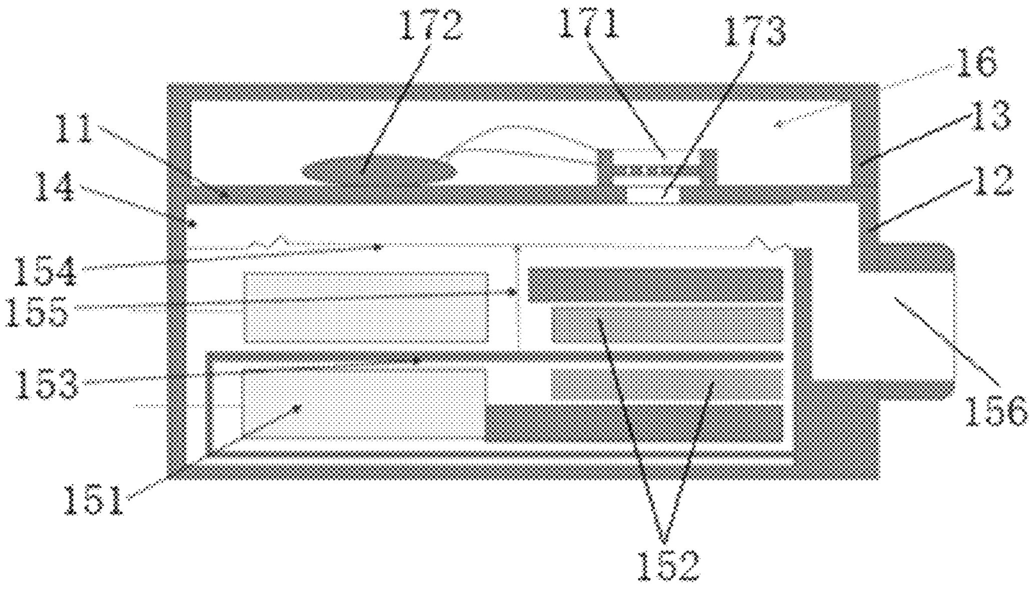
FIG. 1 is a cross-sectional structural illustration of an active noise reduction acoustic unit of the present disclosure.

Referring to FIG. 1, according to an embodiment of the present invention, provided is an active noise reduction acoustic unit. The active noise reduction acoustic unit includes a casing and a baseplate 11. The baseplate 11 is arranged in the casing, and the baseplate 11 separates the casing into a first accommodating cavity 14 and a second accommodating cavity 16. The first accommodating cavity 14 and the second accommodating cavity 16 are in communication with each other, the second accommodating cavity 16 is provided therein with a feedback microphone, and the feedback microphone is configured to pick up noise signals. The first accommodating cavity 14 is provided therein with a moving iron speaker which can vibrate and produce sound according to the noise signals.

The active noise reduction acoustic unit provided by the embodiment of the present disclosure can perform active noise reduction. A principle of actively reducing the noise by utilizing the active noise reduction acoustic unit is as follows: the feedback microphone picks up a surrounding noise signal, a signal with same amplitude and opposite phase is output to the moving iron speaker after the noise signal is backward processed by a noise reduction circuit, and a phase-inverted noise signal output by the moving iron speaker counteracts and neutralizes a noise signal directly entering ears of a user, so as to achieve noise reduction. A moving iron speaker can be either used for sound hearing or used for generating an inverted noise in active noise reduction. In an acoustic unit with the active noise reduction function in the prior art, the feedback microphone and the speaker are two completely independent units, such an arrangement occupies a large space and is inconvenient to install. According to the active noise reduction acoustic unit provided by the embodiment of the present disclosure, the baseplate 11 thereof is a shared component which separates the casing into a first accommodating cavity 14 and a second accommodating cavity 16, wherein the first accommodating cavity 14 is used for carrying the moving iron speaker and the second accommodating cavity 16 is used for carrying the feedback microphone. That is, the moving iron speaker and the feedback microphone are assembled and integrated into one acoustic unit, thereby effectively reducing the size. Further, functions of the moving iron speaker and the feedback microphone can be tested uniformly when the unit is tested after the active noise reduction acoustic unit is assembled thereto, thereby effectively saving the testing time, improving the testing consistence and facilitating subsequent ANC debugging.

In an embodiment, the casing includes a first casing 12 and a second casing 13, the first casing 12 and the baseplate 11 enclose the first accommodating cavity 14, and the second casing 13 and the baseplate 11 enclose the second accommodating cavity 16. The baseplate 11 and the first casing 12 are integrally formed, and the baseplate 11 and the second casing 13 are welded or bonded together. That is, the baseplate 11 and the first casing 12 are of one integrated structure, and the second casing 13 and the baseplate 11 are fixed together by way of welding or bonding. In this way, the sealing between the moving iron speaker and the feedback microphone is very effective.

In an embodiment, the moving iron speaker includes a voice coil 151, magnets 152, an iron sheet 153, a vibrating diaphragm 154 and a connecting bar 155. There are two oppositely arranged magnets 152 with a gap therebetween; the iron sheet 153 penetrates through the voice coil 151 and is inserted into the gap between the two magnets 152; and the connecting bar 155 has one end thereof fixed to the iron sheet 153 and the other end thereof fixed to the vibrating diaphragm 154. A working principle of the moving iron speaker is as follows: the voice coil 151 is electrified to generate a magnetic field and magnetize the iron sheet 153; the magnetic field of the iron sheet 153 varies as a function of the electrical signal, the iron sheet 153 vibrates due to an interaction between the magnetic field of the iron sheet 153 and the magnetic fields of the magnets 152; and the vibration is propagated to the vibrating diaphragm 154 via the connecting bar 155, such that the vibrating diaphragm 154 vibrates to produce sound. In an embodiment, a side portion of the first casing 12 is provided with a sound outlet 156 in a position close to the vibrating diaphragm 154. The sound generated by vibration of the vibrating diaphragm 154 is propagated out via the sound outlet 156.

In an embodiment, the feedback microphone includes a capacitance acoustoelectric conversion component 171 and a signal processing component 172, and the capacitance acoustoelectric conversion component 171 and the signal processing component 172 are in electrical connection, and both are arranged on the baseplate 11. For example, the capacitance acoustoelectric conversion component 171 and the signal processing component 172 can be fixed to the baseplate 11 by way of bonding or pasting. Of course, the capacitance acoustoelectric conversion component 171 and the signal processing component 172 can also be electrically connected with the baseplate 11 in a way known to those skilled in the art, which is not described in detail herein.

In an embodiment, the baseplate 11 is provided with a sound hole 173 in a position corresponding to the capacitance acoustoelectric conversion component 171, and the sound hole 173 is in communication with the first accommodating cavity 14. An external noise air flow enters the capacitance acoustoelectric conversion component 171 via the sound hole 173 to generate a sound signal, and the sound signal converted into an electrical signal by the capacitance acoustoelectric conversion component 171 is transmitted to the signal processing component 172 to be processed. After the signal processed by the signal processing component 172 is backward processed by the noise reduction circuit, a signal with same amplitude and opposite phase is output to the moving iron speaker.

In an embodiment, the capacitance acoustoelectric conversion component 171 is an MEMS and the signal processing component 172 is an ASIC chip. In an embodiment, using the micro-electrical mechanical technologies, the MEMS is formed with a vibrating diaphragm and a back electrode plate, and the sound hole 173 is in communication with a back cavity in the MEMS. In particular, the external noise air flow enters the back cavity of the MEMS via the sound hole 173, and then triggers the vibrating diaphragm arranged on the MEMS to vibrate, such that a capacitance value between the vibrating diaphragm and the back electrode plate changes. In the case that the voltage remains unchanged, a changing current is generated, and thus conversion from the sound signal to the electrical signal is accomplished, while the electrical signal is transmitted to the ASIC chip to be processed.

In an embodiment, the baseplate 11 is a PCB. For example, the baseplate 11 can be a PCB of a laminated structure, and the PCB of the laminated structure is provided with a first PCB copper clad layer, a PCB baseplate layer and a second PCB copper clad layer sequentially from inside to outside of the second accommodating cavity 16. Of course, the baseplate 11 can also be a PCB of other structures according to practical needs.

In an embodiment, the second casing 13 is of a metal material. Specifically, for example, the second casing 13 can have a copper casing as the middle layer, while an inner and an outer surface layer of the copper casing are subjected to gold plating treatment. The second casing 13 thus made has an excellent electromagnetic shielding performance, preventing the capacitance acoustoelectric conversion component 171 and the signal processing component 172 therein from external electromagnetic interferences.

In an embodiment, a solder mask can be arranged between the capacitance acoustoelectric conversion component 171 and the baseplate 11 and between the signal processing component 172 and the baseplate 11. Specifically, the solder mask is a printing ink layer. Of course, the solder mask can also be an insulating resin material. When the second casing 13 is fixed together with the baseplate 11 by way of welding, providing the solder mask can prevent electrical conduction of the capacitance acoustoelectric conversion component 171 and the signal processing component 172 with soldering tin from occurring.

Figure 2:
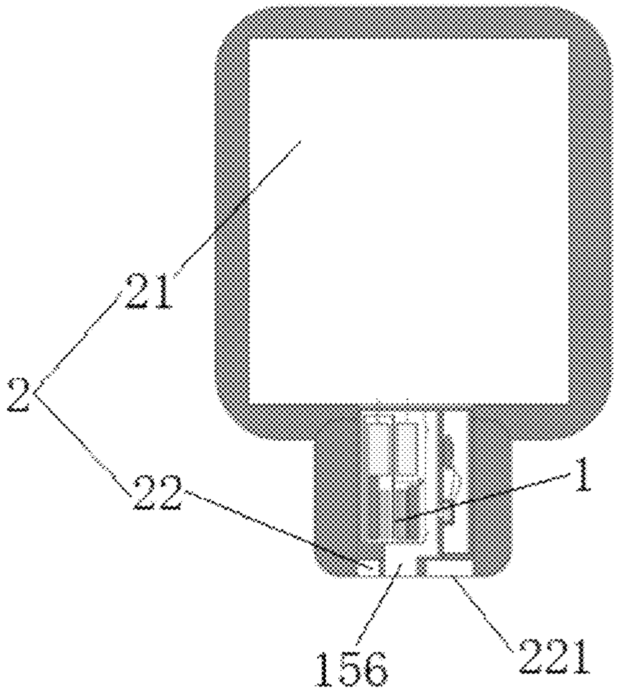
FIG. 2 is a first structural illustration of a sound-producing unit of the present disclosure.
Figure 3:
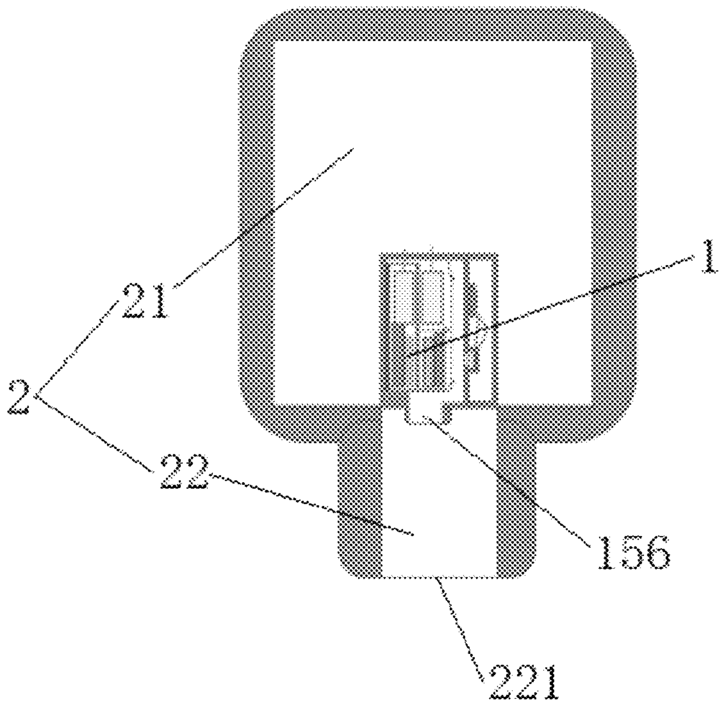
FIG. 3 is a second structural illustration of a sound-producing unit of the present disclosure.

According to another embodiment of the present disclosure, provided is a sound-producing unit which can be a Bluetooth earphone. Referring to FIG. 2 and FIG. 3, the sound-producing unit includes an outer casing 2 and the active noise reduction acoustic unit 1 arranged in the outer casing 2, wherein the outer casing 2 is provided therein with a sound cavity 21 and a sound outlet tube 22 in communication with each other, and an end of the sound outlet tube 22 far away from the sound cavity 21 is provided with a sound outlet opening 221. Referring to FIG. 2, the active noise reduction acoustic unit 1 is located in the sound outlet tube 22 and the sound outlet 156 of the active noise reduction acoustic unit 1 is provided facing the sound outlet opening; alternatively, referring to FIG. 3, the active noise reduction acoustic unit 1 is located in the sound cavity 21, the sound outlet 156 of the active noise reduction acoustic unit 1 is provided facing the sound outlet opening, and a side surface of the active noise reduction acoustic unit 1 provided with the sound outlet 156 is located in a position where the sound cavity 21 and the sound outlet tube 22 meet.

In the prior art, the feedback microphone and the speaker are two independent components. There are three major forms for arranging the feedback microphone in the sound-producing unit: The first is to arrange the feedback microphone in the front sound cavity of the sound-producing unit, in that case, the speaker needs to be moved backward properly. The second is to arrange the feedback microphone in the sound outlet tube, and the sound outlet area of the speaker will be traded off; as such, high-frequency frequency response of the speaker degrades. The third is to arrange the feedback microphone in the back sound cavity, and the feedback microphone is in communication with the front sound cavity via a sound inlet tube; in that case, a bracket is needed to fix the speaker and the feedback microphone, thereby putting a high demand on sealing tightness of the feedback microphone.

In the sound-producing unit provided in the embodiment of the present disclosure, as the moving iron speaker and the feedback microphone are assembled and integrated to one integral active noise reduction acoustic unit, the space in the sound-producing unit can be saved when the active noise reduction acoustic unit is assembled to the sound-producing unit, which is more suitable for a small earphone that is compact in space. Furthermore, it facilitates sealing no matter whether the active noise reduction acoustic unit is arranged in the sound outlet tube 22 or the sound cavity 21, and the sound outlet area of the moving iron speaker will not be traded off completely, such that the high-frequency frequency response of the moving iron speaker will not be influenced.

The embodiments in the description are described in a parallel or sequential way. Each embodiment focuses on what distinguishes it from other embodiments. The same or similar parts of the embodiments can be of reference to each other. The device disclosed by the embodiments is described in a simple way because it corresponds to the method disclosed by the embodiments, where the related part can be referred to description of the method.

Those skilled in the art further can understand that units and arithmetic steps in the examples described in the embodiments disclosed herein can be implemented by way of electronic hardware, computer software or a combination thereof. In order to clearly describe the interchangeability of hardware and software, components and steps of the examples have been generally described in the above description according to functions. Execution of these functions by way of hardware or software is decided in dependence on a specific application and a design constraint condition of the technical solution. Those skilled in the art can implement the described functions for each specific application by using different methods, but such implementations shall not be considered as going beyond the scope of the application.

Steps of the method or algorithm described in combination with embodiments disclosed herein can be implemented by way of a software module executed by hardware and process directly or combination thereof. The software module can be disposed in a random access memory (RAM), an internal memory, a read-only memory (ROM), an electrical programmable ROM, an electrical erasable programmable ROM, a register, a hard disc, a movable disc, a CD-ROM or any other forms of storage media known in the technical field.

It should be further noted that relationship terms herein such as "first" and "second" are merely used for differentiating one body or operation from another body or operation rather than requiring or hinting any actual relationship or sequence among the bodies or operations. Further, the terms "include", "comprise" or any other variants thereof are intended to cover non-exclusive inclusions, such that a process, method, article or apparatus including a series of elements including not only include these elements but also other elements which are not literally included or further include inherent constituents of the process, method, article or apparatus. Unless limited otherwise, elements defined by the term "including a/an . . . " does not exclude the existence of the same elements in the process, method, article or apparatus already including the elements.

The invention claimed is:

1. An active noise reduction acoustic unit, comprising:

a casing comprising a first casing and a second casing;

a baseplate arranged in the casing and separating the casing into a first accommodating cavity and a second accommodating cavity;

wherein the first accommodating cavity and the second accommodating cavity are communicatively coupled, the second casing comprises a metal material, the second casing and the baseplate enclose the second accommodating cavity, the second accommodating cavity including a feedback microphone configured to receive noise signals;

wherein the first casing and the baseplate enclose the first accommodating cavity, the first accommodating cavity includes an iron speaker adapted for vibration to produce sound according to the received noise signals, and a side portion of the first casing is provided with a sound outlet proximate to a vibrating diaphragm of the iron speaker; and wherein the baseplate and the first casing are integrally formed, and the baseplate and the second casing are welded or bonded together.

2. The active noise reduction acoustic unit of claim 1, wherein the iron speaker comprises a voice coil, an iron sheet, the vibrating diaphragm, a connecting bar, and first and second oppositely arranged magnets positioned with a gap therebetween; wherein the iron sheet penetrates through the voice coil and is inserted into the gap; and the connecting bar has one end thereof fixed to the iron sheet and the other end thereof fixed to the vibrating diaphragm.

3. The active noise reduction acoustic unit of claim 1, wherein the feedback microphone comprises a capacitance acoustoelectric conversion component and a signal processing component, wherein the capacitance acoustoelectric conversion component and the signal processing component are in electrical connection and arranged on the baseplate.

4. The active noise reduction acoustic unit of claim 3, wherein the baseplate is provided with a sound hole in a position corresponding to the capacitance acoustoelectric conversion component, and the sound hole is in communication with the first accommodating cavity.

5. The active noise reduction acoustic unit of claim 4, wherein the capacitance acoustoelectric conversion component is a MEMS (Micro-Electro-Mechanical System) and the signal processing component is an ASIC (Application Specific Integrated Circuit) chip.

6. The active noise reduction acoustic unit of claim 5, wherein the MEMS is formed with a vibrating diaphragm and a back electrode plate, and the sound hole is in communication with a back cavity in the MEMS.

7. The active noise reduction acoustic unit of claim 3, wherein a solder mask is arranged between the capacitance acoustoelectric conversion component and the baseplate and between the signal processing component and the baseplate.

8. The active noise reduction acoustic unit of claim 1, wherein the baseplate is a PCB (Printed circuit board).

9. A sound-producing unit, comprising an outer casing and the active noise reduction acoustic unit of claim 1 arranged in the outer casing, wherein the outer easing is provided therein with a sound cavity and a sound outlet tube in communication thereof, and an end of the sound outlet tube distal from the sound cavity is provided with a sound outlet opening; the active noise reduction acoustic unit is located in the sound outlet tube, and a sound outlet of the active noise reduction acoustic unit is provided facing the sound outlet opening.

10. A sound-producing unit, comprising an outer casing and the active noise reduction acoustic unit of claim 1 arranged in the outer casing, wherein the outer casing is provided therein with a sound cavity and a sound outlet tube in communication thereof, and an end of the sound outlet tube distal from the sound cavity is provided with a sound outlet opening; the active noise reduction acoustic unit is located in the sound outlet tube, and the active noise reduction acoustic unit is located in the sound cavity, a sound outlet of the active noise reduction acoustic unit is provided facing the sound outlet opening, and a side surface of the active noise reduction acoustic unit provided with the sound outlet is located in a position where the sound cavity and the sound outlet tube meet.

11. The active noise reduction acoustic unit of claim 1, wherein the second casing have a copper casing as a middle layer, while an inner and an outer surface layer of the copper casing are subjected to gold plating treatment.

* * * * *